(12) United States Patent
Thomas

(10) Patent No.: US 6,202,396 B1
(45) Date of Patent: Mar. 20, 2001

(54) LAWN MOWER WHEEL MECHANISM

(75) Inventor: Roger Thomas, Cleveland (GB)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/334,321

(22) Filed: Jun. 16, 1999

(30) Foreign Application Priority Data

Jun. 16, 1998 (GB) .................................................. 9812932

(51) Int. Cl.[7] .................................................. B60B 33/02

(52) U.S. Cl. .............................................. 56/16.7; 16/35 R

(58) Field of Search ................................. 16/35 R, 18 R; 56/16.7, 201, 322, 17.1, 172.2; 280/86, 89, 47.11, 79.11; 180/19.1; 172/386

(56) References Cited

U.S. PATENT DOCUMENTS

| | | |
|---|---|---|
| 2,523,439 | 9/1950 | May . |
| 2,857,725 | 10/1958 | Canfied . |
| 2,948,544 | 8/1960 | Rowe et al. . |
| 3,382,653 | 5/1968 | De Buigne . |
| 3,974,542 * | 8/1976 | Timmer et al. ...................... 16/35 R |
| 4,321,784 | 3/1982 | Wood et al. . |
| 4,349,937 * | 9/1982 | Fontana ............................. 16/35 R |
| 4,349,938 * | 9/1982 | Fontana ............................. 16/35 R |
| 4,368,806 | 1/1983 | Raineri ............................. 188/2 R |
| 4,815,161 * | 3/1989 | Timmer et al. ...................... 16/35 R |
| 4,835,952 | 6/1989 | McLane . |
| 4,870,811 | 10/1989 | Steele . |
| 5,020,310 | 6/1991 | Oshima et al. . |
| 5,210,998 | 5/1993 | Hojo et al. . |
| 5,269,125 | 12/1993 | Langley, Sr. et al. . |
| 5,297,379 | 3/1994 | Smith ................................. 56/11.8 |
| 5,355,664 | 10/1994 | Zenner . |
| 5,463,855 | 11/1995 | Johnson et al. . |
| 5,653,096 | 8/1997 | Edwards ............................. 56/16.7 |
| 5,819,514 * | 10/1998 | Firdaus ............................. 56/16.7 |
| 5,983,614 * | 11/1999 | Hancock et al. ..................... 56/16.7 |

FOREIGN PATENT DOCUMENTS

| | | |
|---|---|---|
| 2487497 | 12/1997 | (AU) . |
| 3136203 | 9/1981 | (DE) . |
| 29508100 | 5/1995 | (DE) . |
| 29712138 | 7/1997 | (DE) . |
| 0111725 | 11/1983 | (EP) . |
| 0367891 | 2/1989 | (EP) . |
| 0625434 | 5/1994 | (EP) . |
| 0714648 | 6/1996 | (EP) . |
| 2252802 | 11/1973 | (FR) . |

(List continued on next page.)

*Primary Examiner*—Thomas B. Will
*Assistant Examiner*—Nathan Mammen
(74) *Attorney, Agent, or Firm*—Harness, Dickey & Pierce, P.L.C.

(57) ABSTRACT

A lawn mower comprises a cutting deck 2 mounted on at least one castor wheel assembly 4 and a wheel alignment mechanism 30, 38 for orientating the direction of travel of the castor wheel assembly 4. The wheel alignment mechanism 30, 38 comprises a cam mechanism which orients and holds the castor wheel assembly 4 in a predetermined position when operated. The wheel alignment mechanism 30, 38 further comprises a first part mounted on the deck 2 and a second part mounted on the castor wheel assembly 4. A cam 30 is mounted on one part which is rotatable relative to an abutment surface 56 mounted on the other part. The direction of travel of the castor wheel assembly 4 is dependent on the relative orientation of the cam 30 and abutment surface 56. The abutment surface 56 is movable relative to the cam 30 between the a first position where cam 30 is able to freely rotate relative to the abutment surface 56, and a second position where the cam 30 is held in a predetermined angular orientation relative to the abutment surface 56 by the abutment surface 56. The abutment surface 56 engages and angularly orients the cam 30 relative to the abutment surface 56 into the predetermined angular position during its movement from the first position to the second position.

25 Claims, 9 Drawing Sheets

FOREIGN PATENT DOCUMENTS

| | | |
|---|---|---|
| 878834 | 10/1961 | (GB) . |
| 919689 | 2/1963 | (GB) . |
| 1141011 | 1/1969 | (GB) . |
| 1199310 | 7/1970 | (GB) . |
| 1363341 | 8/1974 | (GB) . |
| 1592925 | 9/1981 | (GB) . |
| 2221373 | 2/1990 | (GB) . |
| 2293095 | 3/1996 | (GB) . |
| 2327916 | 2/1999 | (GB) . |
| 9609752 | 4/1996 | (WO) . |
| 9628011 | 9/1996 | (WO) . |

* cited by examiner

LAWN MOWER WHEEL MECHANISM

BACKGROUND OF THE INVENTION

The present invention relates to lawn mowers and in particular to lawn mowers mounted on castor wheels.

A conventional rotary lawn mower comprises a cutting deck mounted on wheels and/or rollers. A motor, which can be either an electric motor or an internal combustion engine, is mounted on the cutting deck and which rotationally drives a cutting blade mounted below the cutting deck about a substantially vertical axis of rotation. A handle is attached to the rear of the cutting deck to enable an operator to maneuver the mower. Often a grass collection box is also attached to the rear of the cutting deck to collect the grass cuttings generated by the mower when in use.

In common designs mower the wheels have a direction of travel which is fixed in a forward and rearward direction. Thus the mower is able to be pushed or pulled in a forward or rearward direction, which is particularly desirable when an operator wishes to operate the mower in straight lines, for instance to generate stripes on a lawn. However, such a design of mower is unable to change direction easily. In order for the direction of travel to be altered, the operator must raise either the front or rear wheels above the ground and rotate the mower to the new direction of travel before then lowering the wheels in order to re-engage the ground. This requires a substantial effort on the part of the operator. Furthermore, the direction of travel of the mower while cutting the grass still remains in a fixed forward/rearward direction which may not be desirable in certain circumstances.

One previously proposed method of overcoming these problems is to mount the mower on castor wheels which are capable of swiveling freely through 360°. This enables the lawn mower to be maneuvered in any direction, in a forward/rearward direction, sideways, diagonally, rotationally etc. This makes the lawn mower highly maneuverable and furthermore, it obviates the need for the operator to raise the wheels off the ground when he wishes to change direction. However, such maneuverability may not be desirable in certain circumstances. For instance, if an operator is using the mower on the side of a hill or bank and the operator wishes to traverse along the side of the hill or bank in a straight line with the mower, the operator would have to use considerable effort to maintain the direction of travel of the mower in a straight line and to prevent the mower from sliding sideways down the hill or bank.

It is therefore desirable to have a lawn mower which is able to be changed between two modes of operation, a first mode where the mower is able to move in any direction both linearly and rotationally i.e. the wheels can freely swivel to any direction of travel, and a second mode where the mower is only able to move in a forward or rearward direction only i.e. the wheels have a fixed direction of travel U.S. Pat. No. 5,653,096 discloses such a mower. The cutting deck of the mower is mounted on three castor wheels. In its first mode of operation, the castor wheels are able to swivel freely enabling the mower to be maneuvered in any direction. In its second mode of operation, the direction of travel of the two rear castor wheels of the mower can be locked in a forward/reverse direction or sideways direction. While the direction of travel of the two rear wheels is fixed, the mower is only able to travel in either a forward/reverse direction or a sideways direction.

The locking mechanism disclosed in U.S. Pat. No. 5,653,096 for each rear castor wheel comprises a locking pin mounted on the cutting deck close to the castor wheel. Corresponding holes, which are capable of receiving the locking pin, are formed in the castor wheel. In the first mode of operation the pin is held away from the holes. The castor wheel is able to freely swivel through 360°. However, when one of the holes in the castor wheel is aligned with the locking pin and the locking pin is moved such that it engages with the hole, the castor wheel is prevented from swiveling, its direction of travel being fixed. The direction of travel of the castor wheel is determined by the position of the hole on the castor wheel.

However, the locking mechanism disclosed in U.S. Pat. No. 5,653,096 suffers from a number of problems. Firstly, the operator has to manually orient each of the castor wheels individually so that the pin and holes become aligned. Secondly, the operator has to bend down in order to grasp the pin in order to either lock or unlock each of the castor wheels individually. This would cause problems for an operator who suffers from back problems. Furthermore, the operator is required to place his hands close to the cutting blade while locking or unlocking the castor wheel, thus putting the operator at unnecessary risk. Fourthly, as the direction of travel of the castor wheel must be fixed with some reasonable accuracy, the diameter of the hole must be similar to that of the pin. However, the castor wheels and hence the holes are located close to the zone swept out by the cutting blade when in use and, as such, would encounter grass cutting and other debris generated by the cutting action of the mower. When the pins are held away from the holes to allow the wheels to freely swivel, it is likely that the holes would fill up with grass cuttings and/or debris, thus preventing the pins from being inserted into the holes. In such circumstances an operator may be tempted to force the pin into the hole, which could be dangerous, particularly in view of the close proximity of the cutting blade to the castor wheel.

SUMMARY OF THE INVENTION

Accordingly to the present invention, a lawn mower comprises a cutting deck mounted on a castor wheel assembly and a wheel alignment mechanism for orienting the direction of travel of the castor wheel assembly. The wheel alignment mechanism orients and holds the castor wheel assembly in a predetermined position when operated.

By constructing the wheel alignment mechanism in this manner, the mower can be used in either of the two modes of operation, the first mode where the castor wheel assembly is able to swivel freely, and a second mode where the castor wheel assembly is held in a predetermined direction of travel and can be easily switched between the two modes.

The wheel alignment mechanism preferably comprises a cam mechanism which orientates the castor wheel assembly to, and holds it in, a predetermined position.

The wheel alignment mechanism can comprise a first part mounted on the deck and a second part mounted on the castor wheel assembly. A cam is mounted on one part which is rotatable relative to an abutment surface mounted on the other part. The direction of travel of the castor wheel assembly is dependent on the relative orientation of the cam and abutment surface. The abutment surface is movable relative to the cam between a first position, where the cam is able to freely rotate ideally through 360° relative to the cam surface, and a second position where the cam is held in a predetermined angular orientation relative to the abutment surface by the cam surface. The abutment surface engages and angularly orients the cam relative to the abutment surface into the predetermined angular position during its movement from the first position to the second position.

The use of the cam mechanism enables the castor wheel assembly to be automatically brought into alignment from any orientation when the mower is changed from operating in the first mode of operation to the second mode of operation. This avoids the need for the operator to manually orient the castor wheel assembly prior to locking it into alignment.

Such a construction is simple but robust. When the cam surface is located in the first position, the cam and hence the castor wheel assembly can freely rotate. This allows the mower to be used in the first mode of operation. When the cam surface is located in the second position, it holds the position relative to the abutment surface, thus preventing it from rotating and hence prevents the castor wheel assembly from swiveling. The abutment surface aligns the cam as it moves from its first position to its second position. This is achieved by the shapes of the cam and the abutment surface which are configured so that they can interact with each other as the abutment surface moves from its first position to its second position regardless of their relative orientation in order to bring the cam into alignment with the abutment surface.

By enabling the cam to rotate through 360° the castor wheel is similarly able to rotate freely through 360°.

To provide a simple design, the cam can have an axis f rotation which is the same as the axis of swivel of he castor wheel. To simplify it further the cam can be rigidly attached to the castor wheel so that the cam and castor wheel rotate in unison.

The abutment surface can be flat. The cam can be symmetrical about its axis of rotation. The shape of the cam can be generally elongate with curved ends. The cam further comprises flat sides. Alternatively, the shape for the cam is that of the outer periphery of the numeral eight. Another possible shape of cam is elliptical. Such shapes interact easily with a wide range of shapes of abutment surface, particularly a flat surface, regardless of their relative orientation.

The movement of the abutment surface may be a linear movement. In one particular design of wheel alignment mechanism, there is provided a maneuverable stirrup wherein the cam is located within the stirrup, at least part of the inner surface of the stirrup forming the abutment surface. The use of stirrup ensures that the wheel alignment mechanism does not get clogged up with grass cuttings or other debris generated while the lawn mower is being operated.

The lawn mower may comprise at least two castor wheel assemblies. Each castor wheel assembly has a wheel alignment mechanism comprising stirrups which are interconnected by a telescopic rod. The telescopic movement of the rod moves the abutment surfaces of the stirrups between their first and second positions. By fixing the direction of travel of two of the castor wheel mechanisms on a lawn mower, the movement of the lawn mower can be restricted to a preset direction. By interconnecting the two stirrups by a telescopic rod, the mechanism by which both stirrups are moved together is simple and easy to operate. Furthermore, it ensures that the stirrups move in unison and that both stirrups move through their full range of motion so that both castor wheels are able to freely rotate or are both fixed in their direction of travel.

The movement of the abutment surface can be pivotal. This can easily be achieved by mounting the cam surface on a pivotal arm.

The lawn mower could comprise at least two castor wheel assemblies which each have a wheel alignment mechanism, comprising pivotal arms which are interconnected by a bar which moves the pivotal arm in unison. The use of such a bar ensures that the wheel alignment mechanisms operate in unison.

The movement of the abutment surface is ideally controlled by a mechanical link. Once such link is a bowden cable.

The use of the bowden cable enables the operator to change the mode of operation of the mower while holding the handle. This enables the mode to be changed during the operation of the mower and ensures that the hands of the operator are kept away from the rotating blade.

As an alternative to a mechanism link, the movement of the abutment surface can be provided by the pivotal movement of a lever. The use of a pivotal lever enables the operator to change the mode of operation of the mower easily and quickly with his foot.

Ideally, the pivot lever comprises a flange located adjacent to the cam, the flange preferably extending past the abutment. The use of a flange prevents interference of the operation of the cam mechanism caused by dirt and debris from being thrown up from under the cutting deck.

The flange can be rigidly attached to the cam.

The stirrup can slide over a surface of the flange when the abutment surface moves between the first position and second position. The flange can thereby provide support for the stirrup.

In one construction, the bowden cable is controlled by a lever box comprising a ratchet mechanism which connects to the bowden cable.

BRIEF DESCRIPTION OF THE DRAWINGS

Four embodiments of the present invention will now be described by way of examples with reference to the following drawings of which.

DESCRIPTION OF THE PREFERRED EMBODIMENTS

Figure 1:
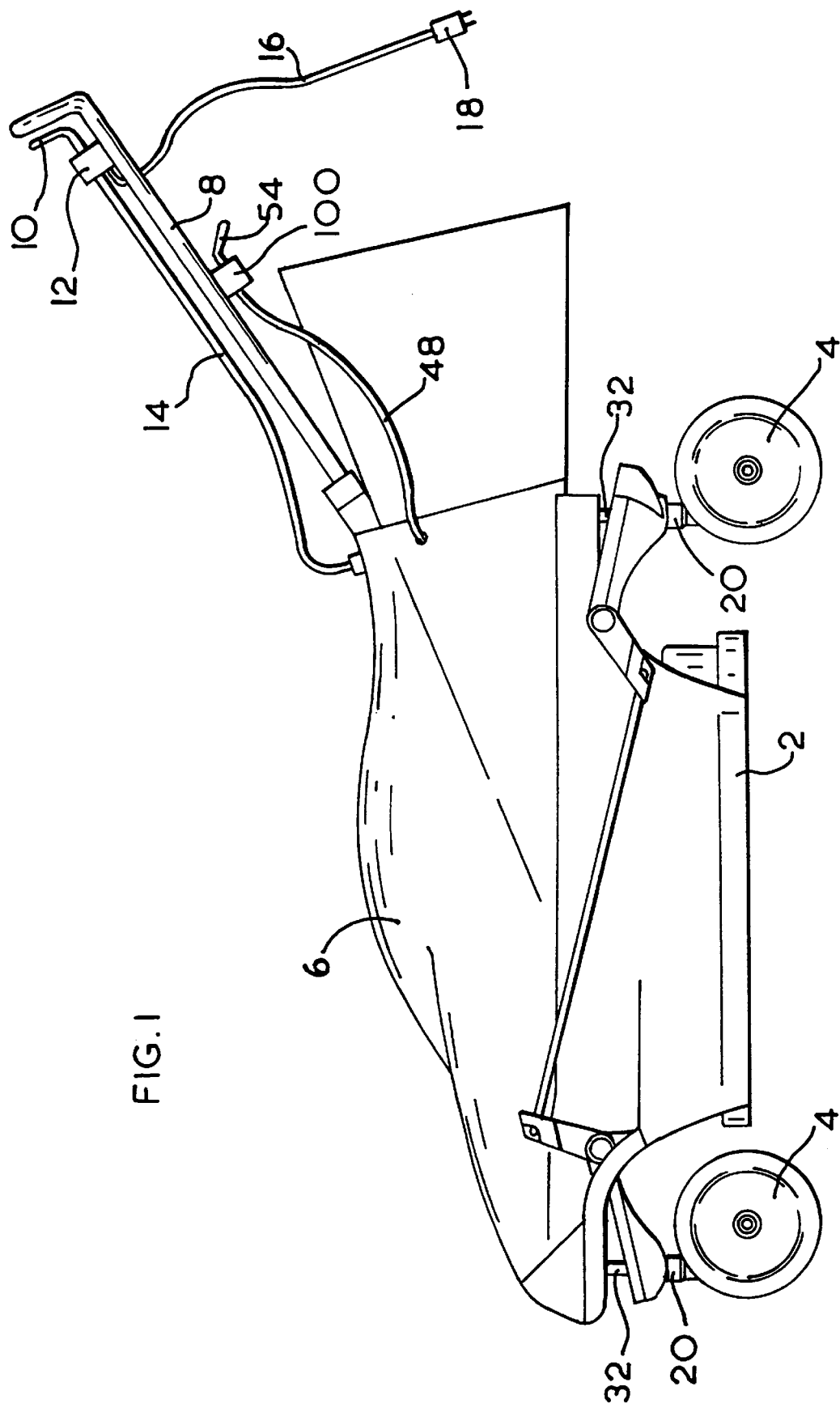
FIG. 1 is a side view of a lawn mower according to the present invention.

Referring to FIG. 1, a lawn mower comprises a cutting deck 2 comprising a frame mounted on four castor wheel assemblies 4 located near to the four corners of the deck 2, an electric motor not shown mounted on the deck and a hood 6 which encloses the motor. The motor rotationally drives a cutting blade not shown mounted below the deck 2 on the output drive spindle of the motor about a substantially vertical axis in known fashion. A handle 8, formed from a hollow metal tube, is attached to the rear of the deck 2. Located on the handle is a lever 10 which projects from a lever box 12 attached to the handle 8 and which encloses an electric switch not shown. An electric cable 14 runs between the lever box 12 and the motor. A second cable 16 runs from the lever box 12 to a plug 18 for attachment to a mains electricity power supply. Depression of the lever 10 activates the motor when the plug 18 is attached to a power supply.

Figure 2:
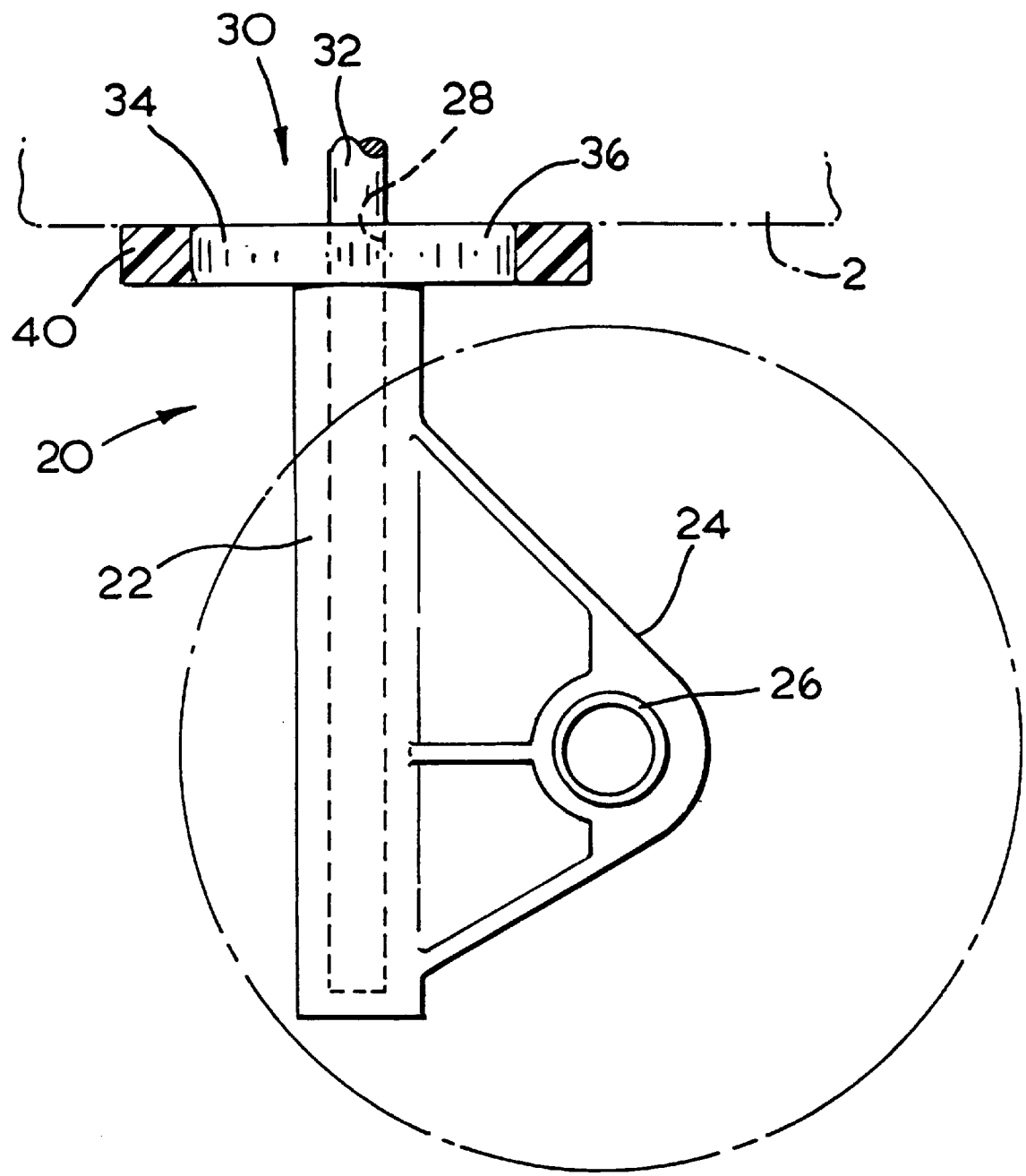
FIG. 2 is a side view of the central mount of the rear castor wheel of the lawn mower shown in FIG. 7.
Figure 3:
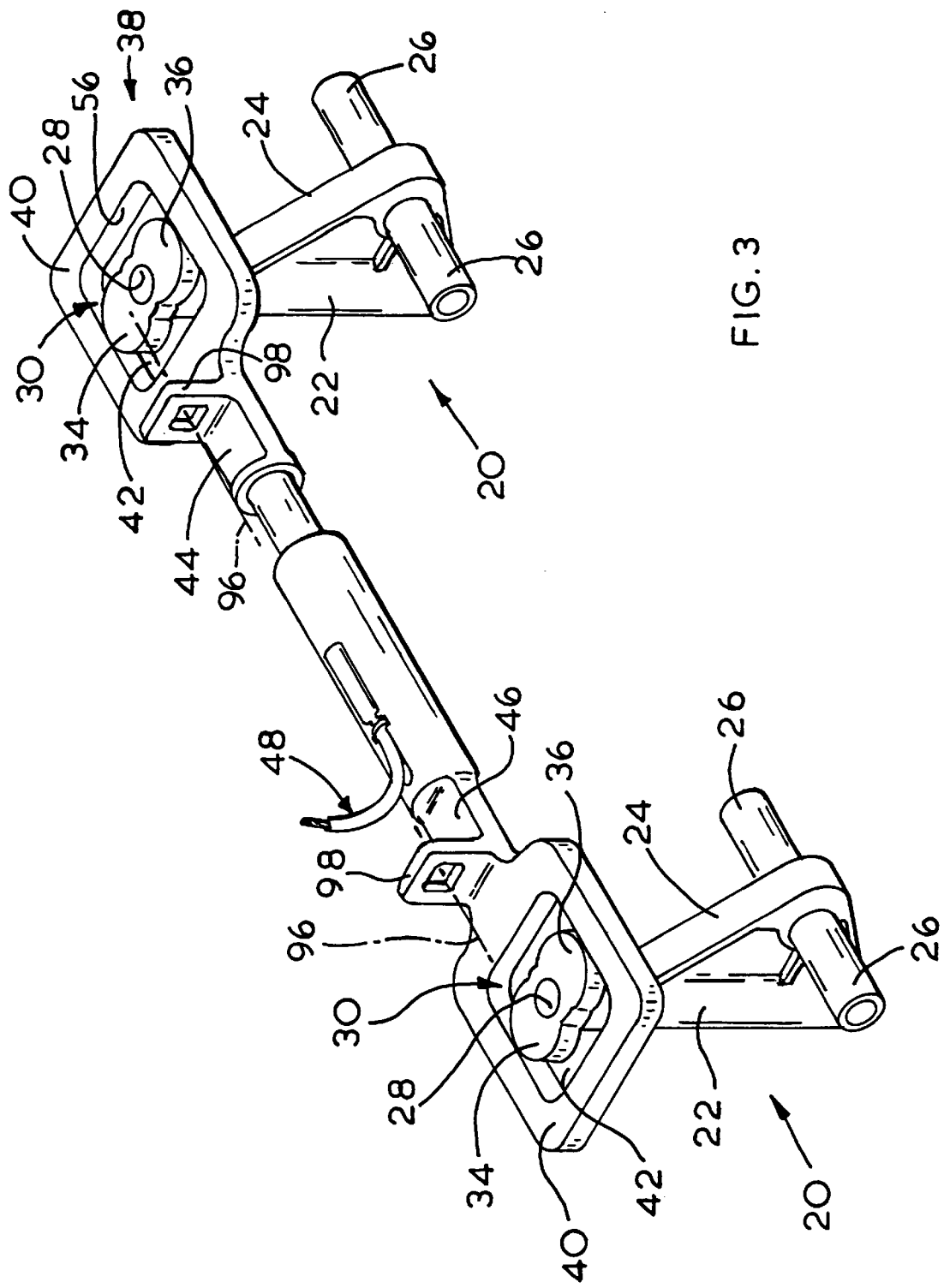
FIG. 3 is a perspective view of the figure of eight cams of the rear wheels located within the stirrups as described in the first embodiment of the present invention.

Each castor wheel assembly 4 comprises two wheels of equal dimensions which are mounted on a central mount 20 adjacent to each other and which have the same axis of rotation. FIGS. 2 and 3 show the central mount. The central mount 20 comprises a vertical sleeve 22, a vertical triangular flange 24 attached to the side of the base of the sleeve 22 and two rods 26 of circular cross section which project perpendicularly from the sides of the triangular flange 24 in opposite directions. The sleeve 22 forms a bore 28 of circular cross section which is sealed at the base end. The two horizontal rods 26 form axles upon which the two wheels are mounted. Each of the wheels are retained upon the axles 26 by means of a clip not shown and are able to freely rotate about the axles 26. The central mount 20 is formed from a plastics material, preferably low friction and in a one piece construction.

At least the two central mounts 20 for the two rear castor wheel assemblies each include a figure of eight cam 30 integrally formed with the central mount around the sleeve 22 between the top of the sleeve 22 and the triangular flange 24. The central mount 20 for the two front castor wheel assemblies may similarly comprise figure of eight cams 30.

Each castor wheel assembly is mounted on a metal rod 32 which is rigidly attached to and projects vertically downwards from the underside of the cutting deck 2 as best shown in FIG. 1. The metal rod 32 has a circular cross section having a diameter which is slightly less than that of the bore 28 of the central mount 20. The metal rod 32 is located within the bore 18 of the central mount, the central mount 20 being able to freely rotate about the metal rod 32. A clip not shown holds the central mount 20 onto the metal rod 32, preventing it from sliding off the rod 32 while allowing it to freely rotate about the rod 32.

The figure of eight cam 30 is so called because the outer periphery of the cam 30 is shaped in a similar manner to the outer periphery of the numeral "8" when viewed from above as best shown in FIG. 3. The thickness of the figure of eight cam 30 is uniform across the width and length of the cam 30. One circular lobe 34 of the figure of eight cam 30 projects horizontally in the same direction as the forward direction of travel of the castor wheel 4, perpendicularly to the longitudinal axis of the sleeve 22. The second circular lobe 36 projects horizontally in the opposite direction to the first lobe, in the reverse direction of travel of the castor wheel. The dimensions of the two lobes 34, 36 are the same. The two lobes are mounted symmetrically about the sleeve 22 and hence about the axis of swivel.

Each of the two figure of eight cams 30 on the two rear castor wheel assemblies are located within a stirrup 38 as best shown in FIG. 3. Each stirrup 38 comprises a flat rectangular plastic end piece 40 having a vertical rectangular hole 42, forming a rectangular frame which surrounds the figure of eight cam 30. The thickness of the stirrup 38 is uniform and is approximately equal to that of the cam 30.

The two stirrups 38 are rigidly attached to the ends of a telescopic rod. The telescopic rod comprises two sections 44, 46, a first section 44 which is capable of sliding into and out of a second section 46. The telescopic rod is positioned so that its longitudinal axis is horizontal and extends widthwise between the two rear castor wheels 4 under the deck 2 of the mower. Integrally formed on each of the two sections is a hoop 98 through which a rod not shown projects in a direction indicated by dashed lines 96. The rod 96 is rigidly mounted on the inner wall of the deck 2. The hoops 98 support the telescopic rod and prevent it from rotating about into longitudinal axis while allowing the two halves telescopically move relative to each other.

A spring not shown is located within the telescopic rod which biases the first section 44 out of the second section 46.

Figure 4A:
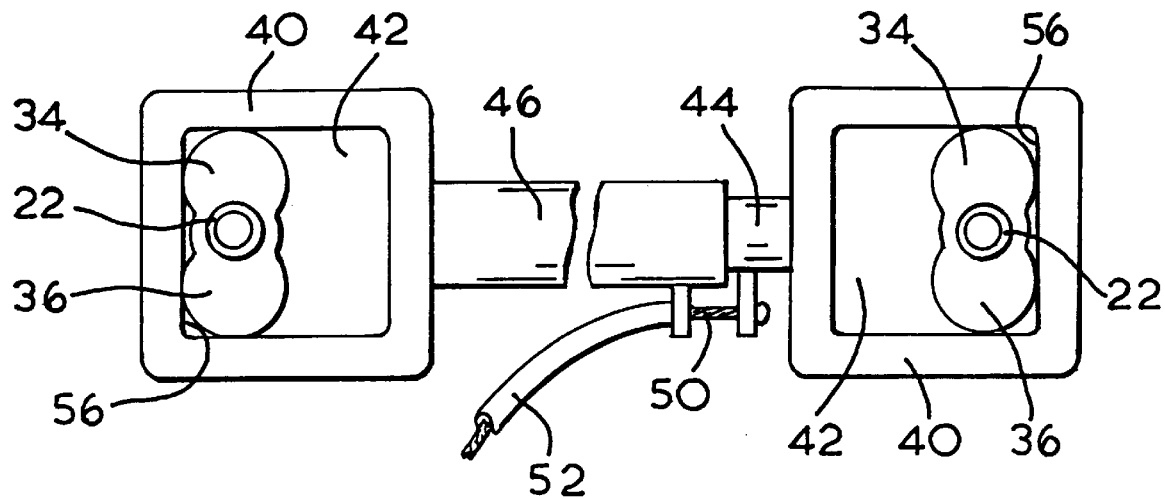
FIGS. 4A and 4B show the two positions of the stirrups as described in the first embodiment of the present invention.
Figure 4B:
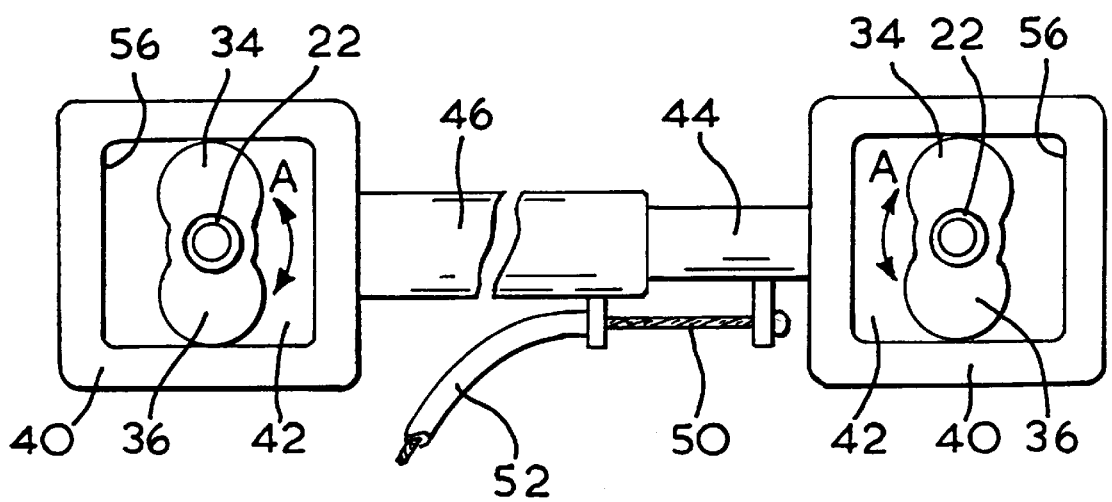

A bowden cable 48 which comprises a cable 50 surrounded along its length by a sleeve 52 runs between the handle 8 of the mower and the telescopic rod. The sleeve 52 of the bowden cable 48 is attached to the second section 46 of the telescopic rod. The cable 50 within the sleeve 52 of the bowden cable 48 extends beyond the sleeve 52 inside the second section 46 of the telescopic rod and attaches to the first section 44 of telescopic rod. Movement of the cable 50 into the sleeve 52 of the bowden cable moves the first section 44 into the second section of the telescopic rod by a corresponding amount against the biasing force of the spring. FIGS. 4A and 4B show the bowden cable 48 attached to the two sections 46, 48 of the telescopic rod in a slightly different manner to that shown in FIG. 3. In FIGS. 4A and 4B, the cable 50 of the bowden cable 48 extends from the sleeve 52 externally of the second section 46 and attaches to the first section 46. However, the telescopic rod in FIGS. 4A and 4B operates in the same manner as that in FIG. 3.

The other end of the bowden cable 48 attaches to a pivotal lever 54 mounted within a lever box 100 which is mounted on the handle 8 of the lawn mower. Pivotal movement of the lever 54 results in the relative movement between the sleeve 52 of the bowden cable 48 and the cable 50 within it.

Figure 8:
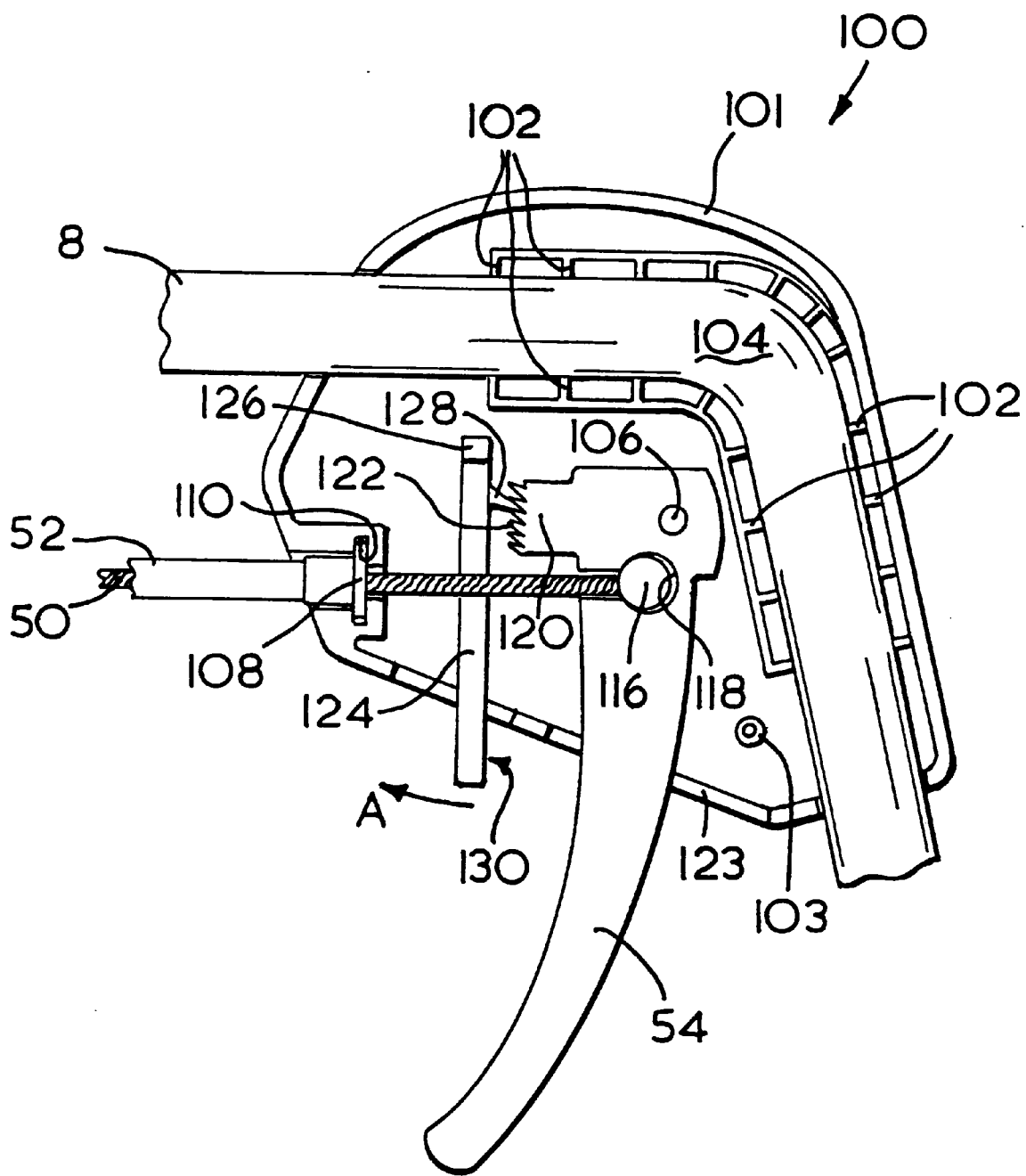
FIG. 8 shows a vertical cross section of the lever box with a ratchet mechanism for operation of the bowden cable used in conjunction with the first embodiment wheel alignment.

FIG. 8 shows the lever box 100 which comprises two plastic clamshells 101 connected together. The rear handle 8, which comprises a hollow metal tube, passes through the lever box 100. A plurality of ribs 102 are integrally formed on the inside of both clamshells and which are shaped to receive and hold the metal tube of the handle 8 when the clamshells are connected together. The two clamshells are attached to each other using three screws, which screw into three bases 103. When the lever box 100 is mounted onto the tube, the tube is sandwiched between the two clamshells. The ribs 102 locate the tube within the clamshells and grip the tube. A bend 104 within the tube is located within the lever box which cooperates with the ribs 102 so as to prevent the lever box 100 sliding along the tube.

The lever 54 pivots about an axis 106. The sleeve 52 of the bowden cable 48 terminates in a circular flange 108 which has a diameter greater than the sleeve 52. The flange slots into a recess 110 formed in the clamshells and holds the flange 108 and sleeve 52 stationary relative to the lever box 100. The cable 50 within the bowden cable 48 is attached to the lever 54 at a point away from its axis 106 of pivot so that pivotal movement of the lever 54 results in a sliding movement of the cable 50 within the sleeve 52. The spring is mounted within the telescopic rod which biases the cable 50 relative to the sleeve 52 so that, at the lever box 100 end of the bowden cable 48, the cable 50 is biased towards being withdrawn into the sleeve 52.

The cable 50 of the bowden cable 48 terminates in a spherical metal ball 116. The pivotal lever 54 comprises a cylindrical recess 118 of similar dimensions to the spherical ball 116 and which has a slot which projects from the recess 118 to the front of the lever 54. The spherical ball 116 is located within the recess 118, the cable 50 passing from the recess 118, through the slot towards the sleeve 52. Pivotal movement of the lever 54 moves the ball 116 and hence cable 50 resulting in relative movement between the cable 50 and the sleeve 52 of the bowden cable 48.

Formed on the lever 54 is a projection 120 on which is formed a series of teeth 122. A resilient catch 124 is mounted at one end 126 in the housing and projects through a hole 123 formed in the wall of the housing. The catch 126 is flexible in the direction indicated by Arrow A. A ridge 128 is formed on the side of the catch 124. The catch 124 is biased towards the teeth 122 so that it engages with the teeth 122. When the lever 54 is pulled, the ridge 128 rides over the teeth 122. The teeth 122 are shaped so that the ridge 128 is prevented from riding over the teeth 122 in the reverse direction. Thus when the lever 54 is squeezed and then released, the catch 124 prevents the lever 54 from returning to its original position by the biasing force of the spring in the telescopic rod. In order to release the lever 54, the operator would push the external part 130 of the catch 124 forward Arrow A, bending the catch 124 and disengaging the ridge 128 from the teeth 122. When the ridge 128 is disengaged, the lever 54 is able to pivot to its original position due to the biasing force of the spring. The catch 124 and teeth 122 act as a ratchet mechanism.

In operation, the operator squeezes the lever 54 to pull the cable 50 to operate the telescopic rod. The operator then releases the lever 54. However, the lever 54 is retained in the squeezed position by catch 124. In order to release the lever 54, the operator slides the external part of the catch 124 forward, releasing lever 54 allowing it to pivot to original position allowing the bowden cable 50 to move back to its original position within the sleeve 52.

Each of the stirrups are moveable between two positions, an inner position shown in FIG. 4A and an outer position shown in FIG. 4B, by axial sliding movement of the two sections of the telescopic rod.

In the outer position FIG. 4B, the vertical axis of the stirrup 38 which passes through the center of the rectangular aperture 42 is aligned with the axis of swivel of the castor wheel assembly i.e. the longitudinal axis of the bore 28. In this position the figure of eight cam is located centrally within the rectangular aperture. The length and width of the rectangular aperture are both greater than the length of the figure of eight cam. Thus, when the stirrup is in the outer position, the figure of eight cam can freely rotate within the rectangular aperture, allowing the castor wheel to freely rotate about the metal rod.

In the inner position FIG. 4A the stirrup 38 has moved inwardly to such an extent that part 56 of the inner wall of the rectangular aperture 42 abuts against the sides of the two lobes 34, 36 of the figure of eight cam 30. While the stirrup 38 is in this position the figure of eight cam 30 is held stationary and prevented from rotating, thus preventing the castor wheel assembly 4 from rotating about the metal rod 32. Therefore, when the stirrup 38 is located in the second position, the direction of travel of the castor wheel assemblies 4 remains fixed in a forward/rearward direction.

In use, the stirrups 38 are biased towards the outer position by the spring located within the telescopic rod. The rear wheels are, therefore, able to freely rotate about their axis of swivel. An operator can maneuver the lawn mower in any direction.

However, when the operator wishes to fix the direction of travel of the mower in a forward/rearward direction, he pulls on the lever 54 which, in turn, pulls the cable 50 into the sleeve 52 of the bowden cable 48. The relative movement of the cable 50 and sleeve 52 of the bowden cable 48 pulls the first section 44 of the telescopic rod into the second section 46 of the telescopic rod against the biasing force of the spring moving the two stirrups from their outer positions towards their inner positions.

While the stirrup is in the outer position, the figure of eight cam 30 may be located at any angular orientation within the rectangular aperture of the stirrup. As the stirrup 38 moves from the first to second position, part 56 of the inner surface of the stirrup 38 will engage with the side of one or other of the lobes 34, 36 depending on the angular orientation of the figure of eight cam 30. As the stirrup 38 continues to move inwardly the outer edge of the lobe 34, 36 in contact with the inner surface 56 of the stirrup will slide along the inner surface 56, causing the figure of eight cam 30, together with the castor wheel 4, to rotate. The stirrup 38 continues to move inwardly until the figure of eight cam 30 has rotated sufficiently so that the side of the second lobe 34, 36 also comes into contact with the inner surface 56 of the stirrup 38. The figure of eight cam 30 is thus prevented from rotating any further, the stirrup 38 also being prevented from sliding inwardly any further. When both lobes 34, 36 are in contact with the inner surface 56 the stirrup is located in the inner position. While in this position the figure of eight cam 30 is aligned with part 56 of the inner surface of the stirrup. Thus, the direction of travel of the rear castor wheel assemblies 4 remains fixed.

By operating in this manner, the inner surface 56 of the stirrup 38 acts as an abutment surface, engaging with the figure of eight cam 30 and rotating it to a predetermined direction as the stirrup 38 moves from the first to the second position, and holding it stationary in the predetermined position while the stirrup 38 remains in the second inner position.

The stirrups 38 are maintained in the inner positions by the operator holding the lever 54 which in turn holds on the bowden cable 48.

In order to move the stirrups 38 from their second inner positions to their first outer positions, the operator releases the lever 54, removing any tension from the bowden cable 48. The first section 44 of the telescopic rod is pushed outwardly from the second section 46 due to the biasing force of the spring. The telescopic rod extends until the stirrups 38 move to their outer positions. During the movement of the stirrups from their inner second positions to their outer first positions, the inner surface 56 disengages from the cam 30 allowing it to rotate and moves to a position such that the cam 30 is able to freely rotate.

Figure 5:
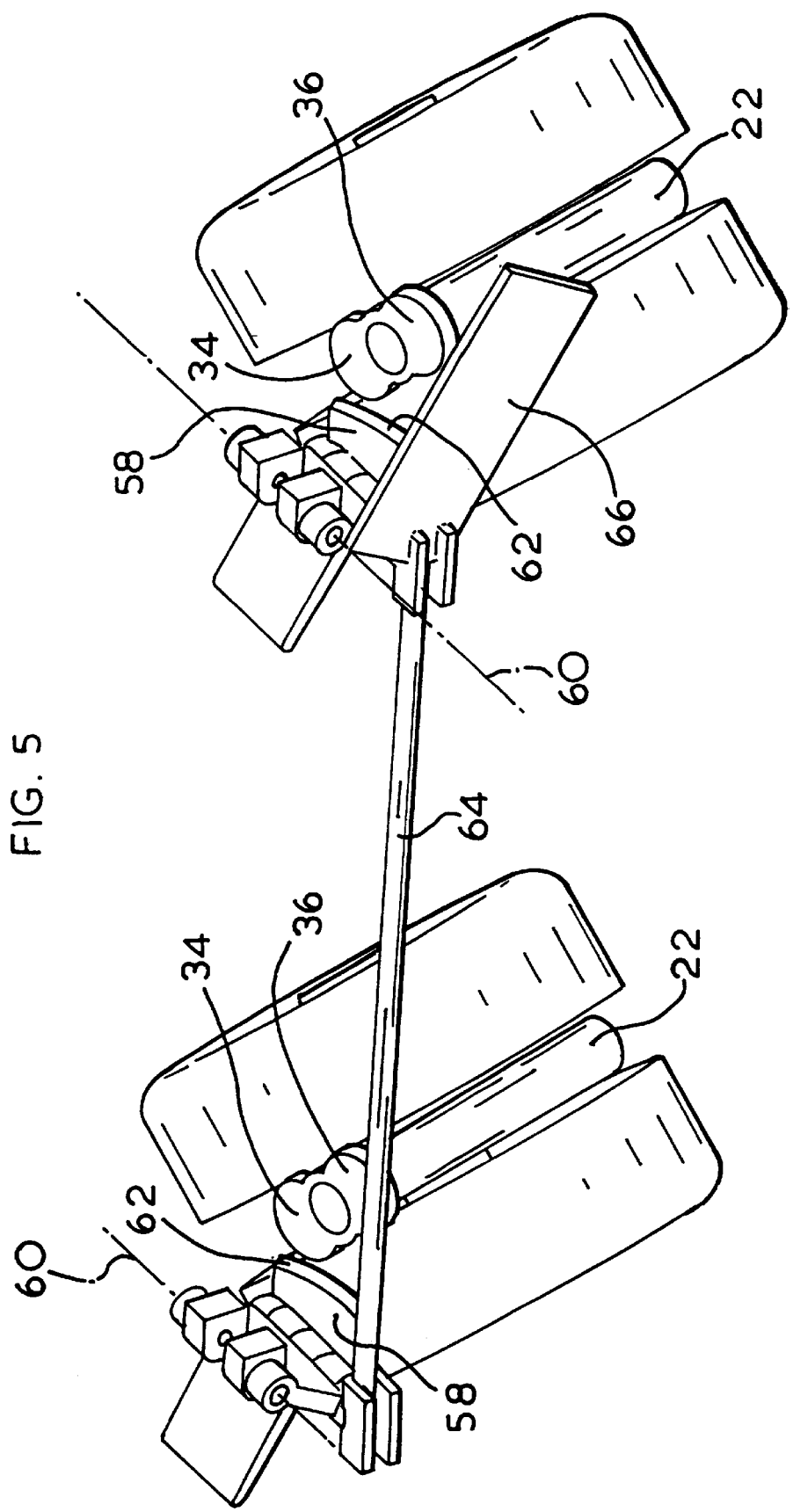
FIG. 5 shows the figure of eight cam and the pivotal arm in its first outer position as described in the second embodiment of the present invention.
Figure 6:
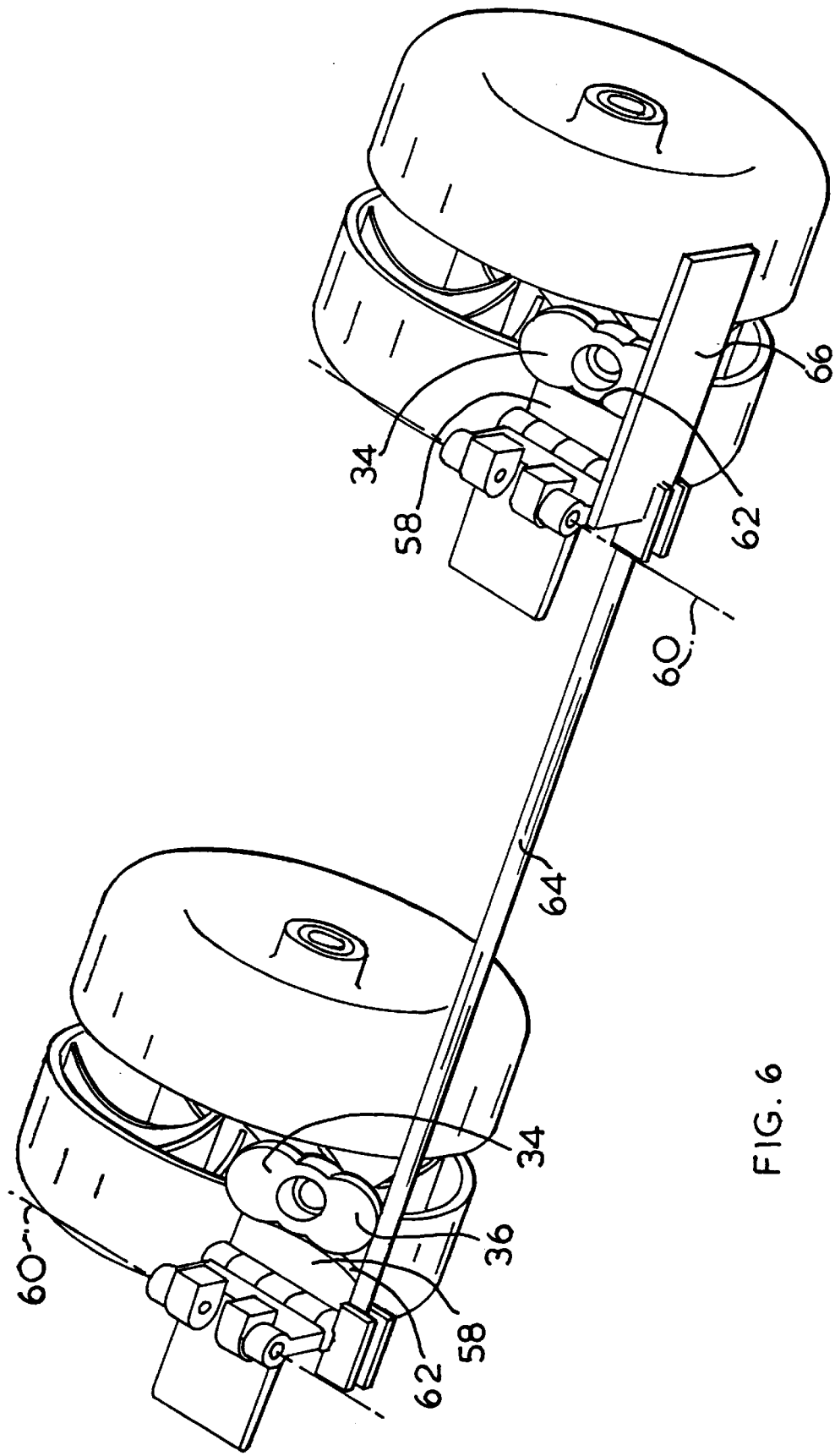
FIG. 6 shows the figure of eight cam and the pivotal arm in its second inner position as described in the second embodiment of the present invention.

FIGS. 5 and 6 show the second embodiment of the present invention.

In the second embodiment, the rear castor wheels of the lawn mower are constructed in the same manner as in the first embodiment and are mounted on vertical metal rods 32 in the same manner as in the first embodiment.

However, an alternative mechanism to the stirrups 38 and the bowden cable 48 is utilized. Adjacent to each rear castor wheel 4 is located an arm 58. The arm 58 is pivotally attached to the underside of the cutting deck the axis of pivot is indicated by reference number 60. The arm 58 comprises an engagement surface 62 along one side is mounted so that the engagement surface can be pivoted towards or away from the outer edge of the figure of eight cam 30.

The arm 58 can be pivoted between two positions, an outer position see FIG. 5 away from the figure of eight cam 30 and an inner position see FIG. 6 against the side of the figure of eight cam 30.

In the first position, the arm 58 is located a sufficient distance away from the figure of eight cam 30 so that the cam 30 and thus the castor wheel 4 can freely rotate about the rod 32.

In the second inner position, the arm has moved pivotally inwardly to such an extent that the engagement surface 62 of the arm 58 abuts against the sides of the two lobes 34, 36 of the figure of eight cam 30. While the arm 58 is held in this position, the figure of eight cam 30 is held stationary and prevented from rotating, thus preventing the castor wheel assembly 4 from rotating about the metal rod 32. Therefore, while the arm 58 is located in the second position, the direction of travel of the castor wheel assembly 4 remains fixed in a forward/rearward position.

The two arms 56 on the two rear castor wheel assemblies 4 are interconnected by a bar 64 which, at one end, pivotally connects to one arm 58, and at the other end, pivotally connects to the other arm 58. The bar 64 ensures that the two arms 58 move in unison. A lever 66 is attached to one of the arms 58 to enable a user to pivot the arms 58 between the two positions. The lever 66 is of known design and therefore is only shown schematically in FIGS. 5 and 6.

When an operator wishes to freely maneuver the mower, he moves the arms 58 to their first position FIG. 5.

When the operator wishes to lock the direction of travel of the two rear wheels he moves the arms 58 to their second position.

As the arms 58 move from the first to second positions, the engagement surface 62 will engage with the side of one or other of the lobes 34, 36, depending on the angular orientation of the figure of eight cam 30. As the arm 58 continues to move inwardly, the outer edge of the lobe 34, 36 in contact with the engagement surface 62 will slide along the engagement surface 62 causing the figure of eight cam 30, together with the castor wheel 4, to rotate. The arm 58 continues to move inwardly until the figure of eight cam 30 has rotated sufficiently so that the side of the second lobe 34, 36 also comes into contact with the engagement surface 62. The figure of eight cam 30 is thus prevented from rotating any further, the arm 58 also being prevented from pivoting inwardly any further. When both lobes 34, 36 are in contact with the engagement surface 62 the arm 58 is located in the second inner position. While in this position the figure of eight cam 30 is aligned with the engagement surface 62. Thus, the direction of travel of the rear castor wheels 4 remains fixed.

By operating in this manner, the engagement surface 58 acts as an abutment surface, engaging with the figure of eight cam 30 and rotating it to a predetermined direction as the arm 58 moves from the first to the second position, and holding it stationary in the predetermined position while the arm 58 remains in the second inner position.

The lever 66 can be latched in either of the two positions by a catch mechanism not shown or a self locking device not shown.

Figure 7:
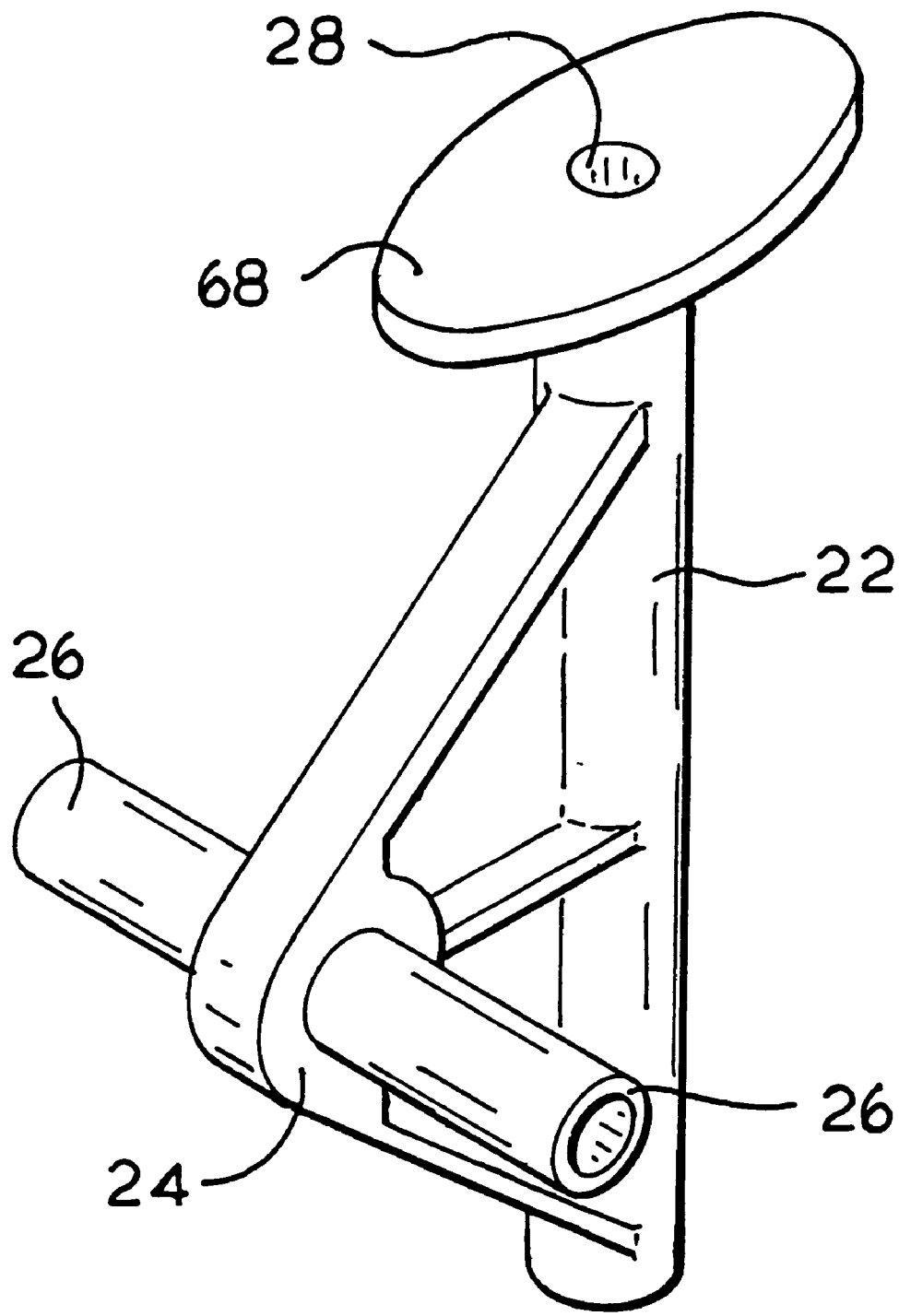
FIG. 7 shows the oval cam as described in the third embodiment of the present invention.

In a third embodiment, the figure of eight cam 30, disclosed in the first and second embodiments, is replaced with an elliptical cam 68 as best seen in FIG. 7.

Figure 9A:
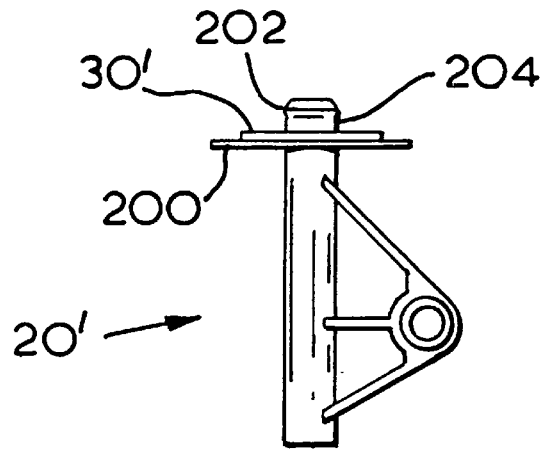
FIGS. 9A to 9C show the central mount of the castor wheel assembly used in the fourth embodiment of the present invention.
Figure 9B:
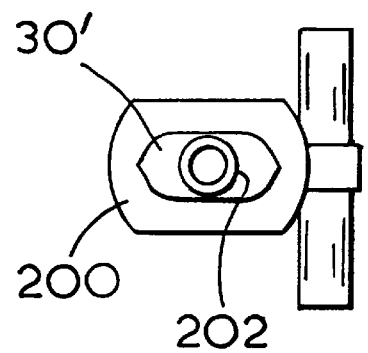
Figure 9C:
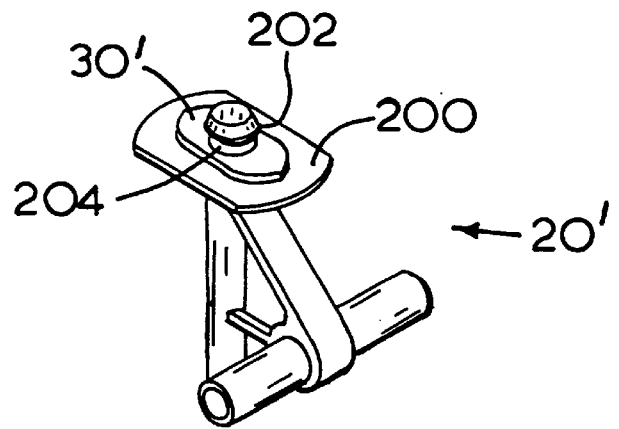

The fourth embodiment is the same as the first embodiment except that the central mount 20 of each castor wheel assembly disclosed in the first embodiment is replaced with a central mount 20' as disclosed in FIGS. 9A to 9C. The construction of the central mount 20' is the same as that described in the first embodiment except that the figure of eight cam has been replaced by an elliptical shaped cam 30' and a flange 200 which has been added below the cam 30'. The flange is integrally formed with the central mount 20'. The plane of the flange 200 is parallel to that of the cam, the flange 200 being adjacent to and abutting against the cam. When the cam is located within the stirrup 38 the flange 200 is located below the stirrup. The top surface of the flange 200 provides a guide surface for stirrup over which the stirrup slides. The dimensions of the flange 200 are such that it is unable to pass through the hole 42 formed by the stirrup 38 and covers the base of the hole 42 while the stirrup 38 is in either its inner or outer position and any position in between. The flange 200 prevents dirt thrown up from below the lawn mower from interfering with the wheel alignment mechanism.

The flange can also provide support for stirrup which can rest on the flange 200. It will be appreciated by the reader that the use of a flange 200 can be any shape of cam including but not limited to, a figure of `8' cam.

A lip 202 is formed around the central sleeve to form a groove 204 between the lip 202 and the cam 30'.

What is claimed is:

1. A lawn mower comprising:
   a castor wheel assembly;
   a cutting deck defining a cutting plane, the castor wheel assembly being rotatably mounted to the cutting deck for rotation through 360° about an axis generally perpendicular to the cutting plane;
   a wheel alignment mechanism connected to the wheel assembly for moving the castor wheel assembly from any orientation to a predetermined orientation and retaining the castor wheel assembly in the predetermined orientation.

2. The lawn mower of claim 1 wherein the wheel alignment mechanism comprises a cam mechanism which moves the castor wheel assembly to and holds it in the predetermined orientation.

3. The lawn mower of claim 2 wherein the wheel alignment mechanism comprises a first part mounted on the deck and a second part mounted on the castor wheel assembly, the cam mounted on one part which is rotatable relative to an abutment surface mounted on the other part, the direction of travel of the castor wheel assembly being dependent on the relative orientation of the cam and the abutment surface wherein the abutment surface is movable relative to the cam between a first position, where the cam is able to freely rotate relative to the abutment surface, and a second position where the cam is held in the predetermined angular orientation relative to the abutment surface by the abutment surface, the abutment surface engaging and angularly moving the cam relative to the abutment surface into the predetermined angular position during its movement from the first position to the second position.

4. The lawn mower of claim 3 wherein the cam can freely rotate relative to the abutment surface through 360° when the abutment surface is located in the first position.

5. The lawn mower of claim 3 wherein the cam has an axis of rotation which is the same as an axis of swivel of the castor wheel assembly.

6. The lawn mower of claim 5 wherein the cam is rigidly attached to the castor wheel assembly so that the cam and castor wheel assembly rotate in unison.

7. The lawn mower of claim 3 wherein the shape of the cam is symmetrical about its axis of rotation.

8. The lawn mower of claim 2 wherein the shape of the cam is generally elongate with curved ends.

9. The lawn mower of claim 8 wherein the cam has flat sides.

10. The lawn mower of claim 8 wherein the cam is shaped like the outer periphery of the numeral "8".

11. The lawn mower of claim 8 wherein the cam is elliptical in shape.

12. The lawn mower of claim 3 wherein the movement of the abutment surface is a linear movement.

13. The lawn mower of claim 3 wherein the cam is located within a moveable stirrup, at least part of the inner surface of the strirrup forming the abutment surface.

14. The lawn mower of claim 13 wherein the lawn mower comprises at least two castor wheel assemblies, each castor wheel assembly having a respective wheel alignment mechanism, the stirrups of which are interconnected by a telescopic rod, the telescopic movement of the rod moving the abutment surfaces of the stirrups between their first and second positions.

15. The lawn mower of claim 3 wherein the movement of the abutment surface is pivotal.

16. The lawn mower of claim 15 wherein the abutment surface is formed on a pivotal arm.

17. The lawn mower of claim 16 wherein the lawn mower comprises at least two castor wheel assemblies, each castor wheel assembly having a respective wheel alignment mechanism the pivotal arms of which are interconnected by a bar which moves the pivotal arms in unison.

18. The lawn mower of claim 3 wherein the movement of the abutment surface is controlled by a mechanical line.

19. The lawn mower of claim 16 where the movement of the abutment surface is activated by the use of a bowden cable.

20. The lawn mower of claim 3 wherein the movement of the abutment surface is generated by the pivotal movement of a lever.

21. The lawn mower of claim 2 wherein the wheel alignment mechanism comprises a flange located adjacent to the cam mechanism.

22. The lawn mower of claim 21 further comprising an abutment surface, wherein the flange extends past the abutment surface.

23. The lawn mower of claim 21 wherein the flange is rigidly attached to the cam.

24. The lawn mower of claim 21, further comprising a stirrup, wherein the stirrup slides over a surface of the flange when the abutment surface moves between the first position and second position.

25. The lawn mower of claim 19 wherein the movement of the bowden cable is controlled by a lever box comprising a ratchet mechanism which connects to the bowden cable.

* * * * *